US008072369B2

(12) United States Patent
Lackey

(10) Patent No.: US 8,072,369 B2
(45) Date of Patent: Dec. 6, 2011

(54) SYSTEM AND METHOD FOR INTERROGATING A TARGET USING POLARIZED WAVES

(75) Inventor: Raymond J. Lackey, Bohemia, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 267 days.

(21) Appl. No.: 12/617,932

(22) Filed: Nov. 13, 2009

(65) Prior Publication Data

US 2011/0115673 A1 May 19, 2011

(51) Int. Cl.
*H01Q 3/00* (2006.01)
*H01Q 21/06* (2006.01)
*H01Q 13/00* (2006.01)
*G01S 7/28* (2006.01)

(52) U.S. Cl. .......... 342/42; 342/188; 342/361; 342/372; 343/786

(58) Field of Classification Search .................... 342/42, 342/188, 361, 372; 343/786
See application file for complete search history.

(56) References Cited

U.S. PATENT DOCUMENTS

| | | | | |
|---|---|---|---|---|
| 3,427,621 | A | 2/1969 | Brunner | |
| 3,453,636 | A | 7/1969 | Perini et al. | |
| 4,336,540 | A | 6/1982 | Goodwin et al. | |
| 4,717,918 | A | 1/1988 | Finken | |
| 5,001,486 | A * | 3/1991 | Bächtiger | 342/42 |
| 5,369,410 | A | 11/1994 | Reich | |
| 5,909,296 | A | 6/1999 | Tsacoyeanes | |
| 6,320,551 | B1 | 11/2001 | Kumar | |
| 6,924,923 | B2 | 8/2005 | Serati et al. | |
| 7,248,841 | B2 * | 7/2007 | Agee et al. | 455/101 |
| 7,515,099 | B2 | 4/2009 | Kwon et al. | |
| 7,525,482 | B1 * | 4/2009 | Lackey et al. | 342/368 |
| 2004/0198401 | A1 * | 10/2004 | Rodgers et al. | 455/502 |
| 2008/0012710 | A1 | 1/2008 | Sadr | |
| 2010/0045515 | A1 * | 2/2010 | Walker et al. | 342/354 |
| 2011/0018766 | A1 * | 1/2011 | Steer et al. | 342/368 |
| 2011/0115673 | A1 * | 5/2011 | Lackey | 342/361 |
| 2011/0115674 | A1 * | 5/2011 | Lackey | 342/361 |

OTHER PUBLICATIONS

Radar Handbook; McGraw-Hill, pp. 12-4-12-5.

* cited by examiner

*Primary Examiner* — John Sotomayor
(74) *Attorney, Agent, or Firm* — Dilworth & Barrese, LLP; Daniel J. Long

(57) ABSTRACT

A system and method for communication that could be used in an identification friend or foe system. The method comprises generating a first message by a processor and controlling a beam steerer to deflect transmitted waves toward a first angle. The method further comprises transmitting the first message through an antenna in communication with the beam steerer toward the spatial angle. The method further comprises controlling the beam steerer to deflect waves received from the spatial angle. The method further comprises receiving a responsive wave at the antenna through the beam steerer at the spatial angle, the responsive wave including a second message responsive to the first message.

20 Claims, 5 Drawing Sheets

50

SYSTEM AND METHOD FOR INTERROGATING A TARGET USING POLARIZED WAVES

BACKGROUND OF THE INVENTION

1. Field of the Invention

This disclosure relates to millimeter (mm) wave communication and, more particularly, to a system and method for beam steering signals interrogating a target and receiving replies from the target using circularly polarized waves.

2. Description of the Related Art

Referring to FIG. 1, in a radar interrogation system 50, a processor 54 sends an interrogation message signal 70 through an antenna 52. An interrogation wave 56 is transmitted by antenna 52 typically in the radio frequency range. Interrogation wave 56 may be steered by a beam steerer 58 so that a transmitted wave 60 is directed toward a particular spatial-direction θ because of phase adjustments by beam steerer 58. Wave 60 tends to be polarized in a particular polarization-direction. These may be linear or circularly polarized. Circularly polarized waves may be represented by orthogonal linear polarizations rotating in space and in time quadrature. That is, the electric field of wave 60 may rotate in a first polarization-direction (circular polarization) as wave 60 travels. As shown in the figure, wave 60 may have right hand circular polarization (RHCP)—i.e. from a frame of reference, the electric field rotates clockwise, looking in the spatial-direction of propagation. When wave 60 hits a target 64, wave 60 is partially reflected back as reflected wave 62 toward beam steerer 58 and antenna 52. Reflected wave 62, because of phase reversal in one of the linear components of the reflection, may have an electric field rotating a second polarization-direction opposite the first polarization-direction, counter clockwise, looking in the spatial-direction of propagation, or left hand circularly polarized (LHCP). In the figure, reflected wave 62 is left hand circular polarized. Reflected wave 62 is received by antenna 52, converted into a received signal (not shown) and processed by processor 54. In this way, processor 54 can determine whether target 64 is near antenna 52 at spatial angle θ. This disclosure relates to an improvement over these prior art technologies.

SUMMARY OF THE INVENTION

One embodiment of the invention is a method for communicating, the method comprising generating a first message by a processor and controlling a beam steerer to deflect transmitted waves toward a spatial angle. The method further comprises transmitting the first message through an antenna in communication with the beam steerer toward the spatial angle; and controlling the beam steerer to deflect waves received from the spatial angle. The method further comprises receiving a responsive wave at the antenna through the beam steerer at the spatial angle, the responsive wave including a second message responsive to the first message.

Another embodiment of the invention is a communication system. The system comprises a processor; an antenna in communication with the processor; and a beam steerer in communication with the antenna and the processor. The processor is effective to generate a first message; generate a first control signal to control the beam steerer to deflect transmitted waves toward a spatial angle; and cause the antenna to transmit the first message toward the spatial angle. The processor is further effective to generate a second control signal, distinct from the first control signal, to control the beam steerer to deflect waves received from the spatial angle; and receive from the antenna a second message in a responsive wave, the second message responsive to the first message and received by the beam steerer at the spatial angle.

Yet another embodiment is a communication system. The system comprises a processor; a first antenna in communication with the processor; and a beam steerer in communication with the first antenna and the processor. The processor is effective to generate a first message; generate a first control signal to control the beam steerer to deflect waves toward a spatial angle and to transmit waves polarized in a first polarization-direction toward the spatial angle by applying a first current to the beam steerer. The processor is further effective to cause the antenna to transmit the first message toward the spatial angle using waves circularly polarized in the first polarization-direction. The system further comprises a target, the target including a second antenna, the second antenna effective to receive the first message and transmit a responsive wave including a second message responsive to the first message, the responsive wave including waves circularly polarized in the first polarization-direction. The processor is further effective to generate a second control signal, distinct from the first control signal, to control the beam steerer to deflect waves received from the spatial angle and to receive waves polarized in the first polarization-direction from the spatial angle by applying a second current to the beam steerer; and receive the second message from the first antenna.

BRIEF DESCRIPTION OF THE DRAWINGS

The drawings constitute a part of the specification and include exemplary embodiments of the present invention and illustrate various objects and features thereof.

DETAILED DESCRIPTION OF THE PREFERRED EMBODIMENT(S)

Figure 1:
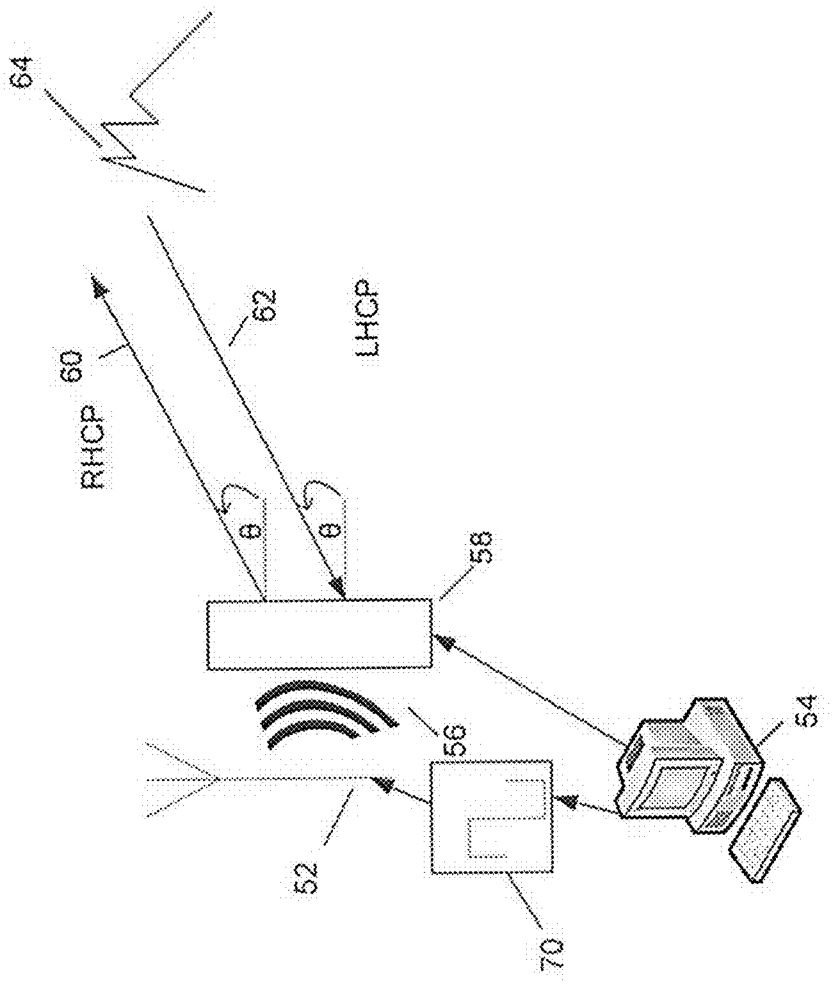
Fig. 1 Prior Art
FIG. 1 is a system drawing of a prior art radar system.

Various embodiments of the invention are described hereinafter with reference to the figures. Elements of like structures or function are represented with like reference numerals throughout the figures. The figures are only intended to facilitate the description of the invention or as a guide on the scope of the invention. In addition, an aspect described in conjunction with a particular embodiment of the invention is not necessarily limited to that embodiment and can be practiced in conjunction with any other embodiments of the invention.

Referring still to FIG. 1, the prior art systems described above work well for a radar based arrangement where a wave reflected off of a target is processed by processor 54. As beam steerer 58 steers wave 60 toward target 64 at spatial angle θ, waves polarized in a first polarization-direction are emitted (right hand circular polarized waves are shown). Simultaneously, beam steerer 58 is set up to receive waves 62 polarized in a second polarization-direction (left hand circular polarized waves are shown).

Figure 2:
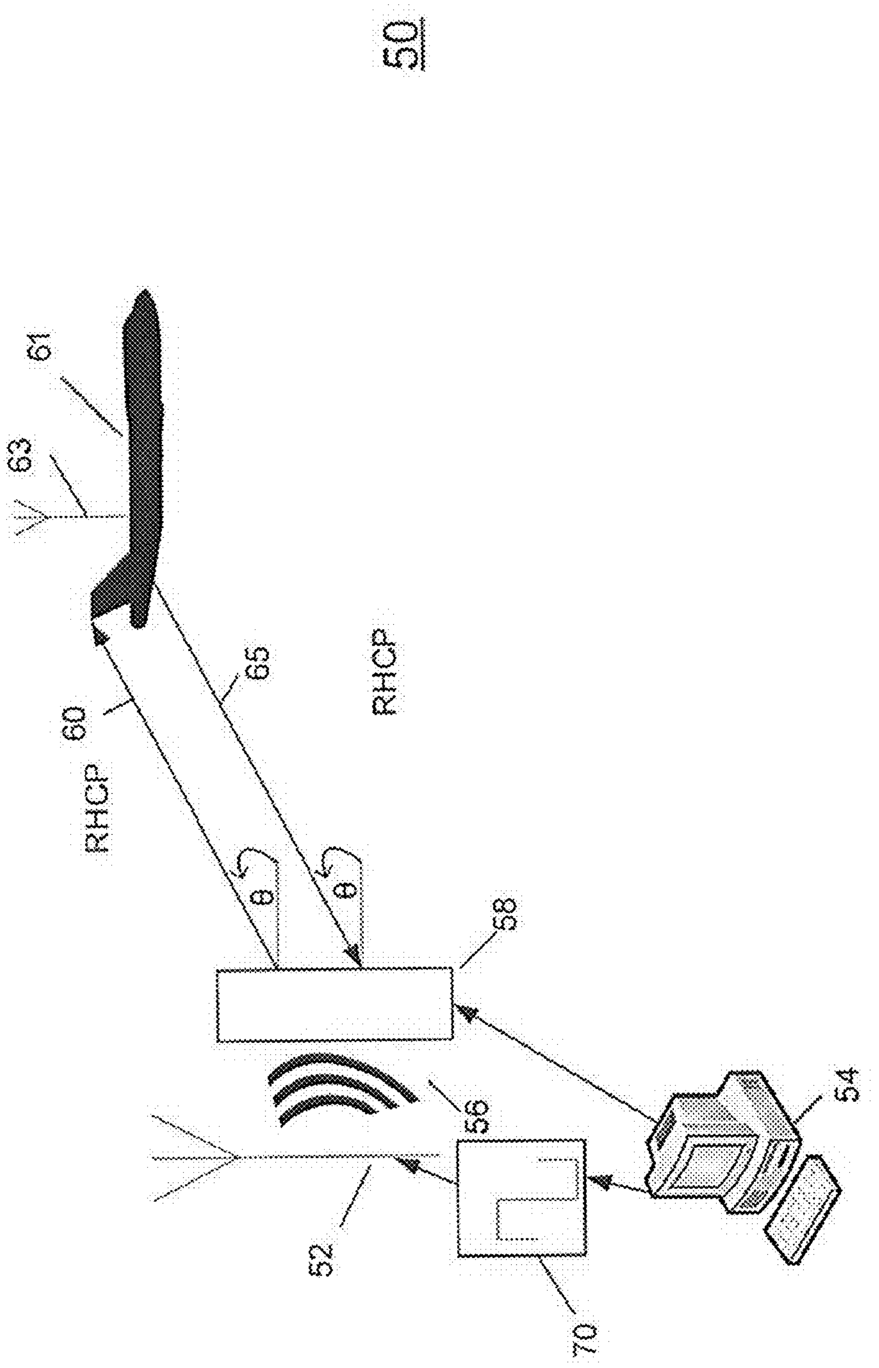
FIG. 2 is a system drawing of an interrogation system.

However, such systems have significant deficiencies in identification friend or foe (IFF) applications where the target includes a transponder that radiates a wave with the same polarization as the interrogation. Referring to FIG. 2, target 61 would receive interrogation wave 60 and then transmit a responsive wave 65 from an antenna 63. That responsive wave 65 likely will include waves also polarized in the first polarization-direction. The prior art system of FIG. 1 with beam steerer 58 is not oriented to receive responsive wave 65 and responsive wave 65 will either not be detected at all or may lose significant gain before being processed by processor 54.

Figures 3A, 3B:
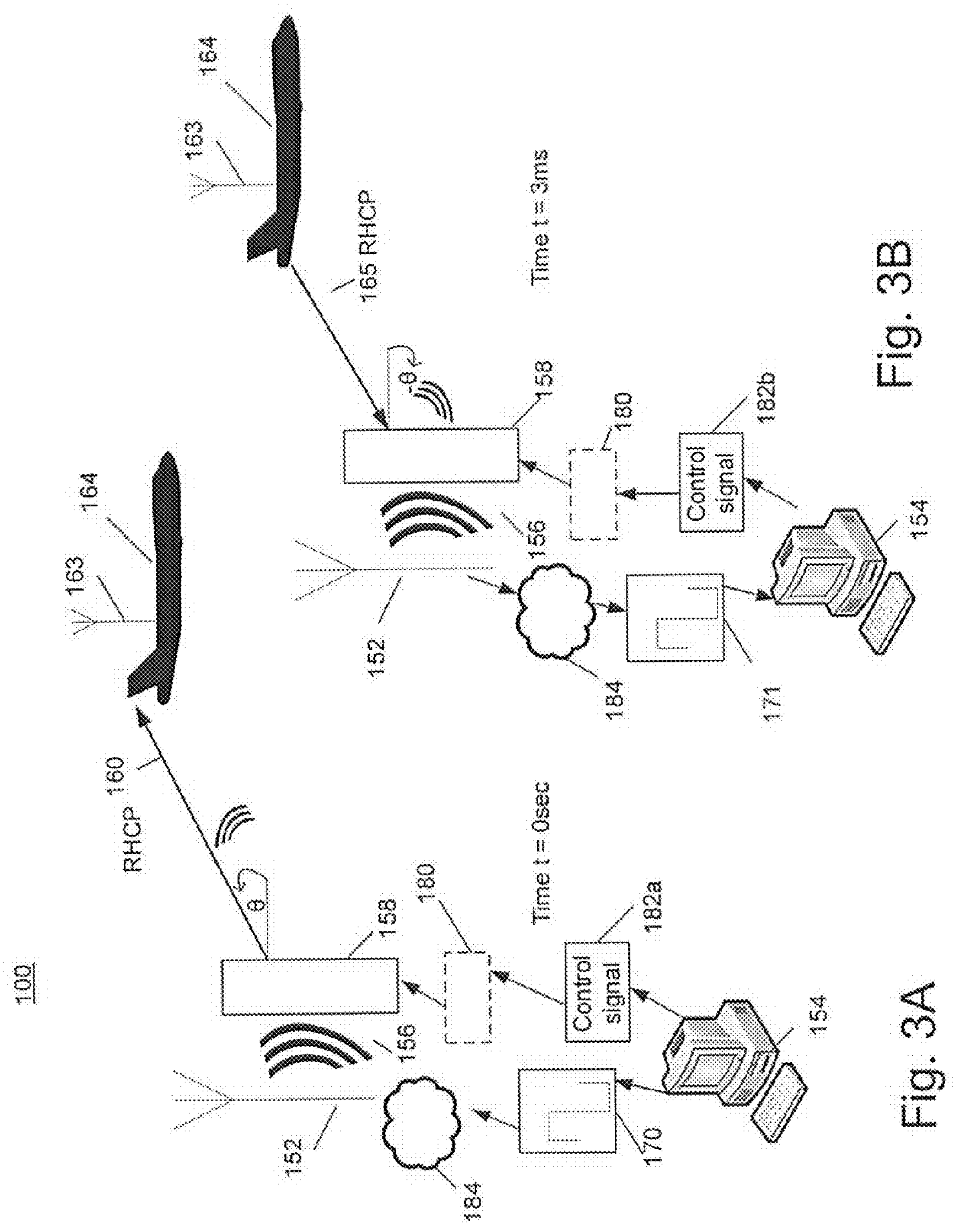
FIG. 3A is a system drawing of a communication system in accordance with an embodiment of the invention.
FIG. 3B is a system drawing of a communication system in accordance with an embodiment of the invention.

Referring to FIG. 3A, there is shown a communication system which overcomes the above deficiencies and could be an interrogation system 100 in accordance with an embodiment of the invention. The discussion below relates to use in an IFF system though it should be clear that the system would work with any half-duplex data link. In system 100, a processor 154 sends an interrogation message 170 to an antenna 152 perhaps through an RF feed network 184 all in communication with each other. RF feed network 184 could be a single port or multiple ports. Multiple ports could be used with a coupler for sum and difference processing such as may be used to sharpen an effective beam width of antenna 152. Antenna 152 could be any type of antenna such as, for example, a single horn, multiple horns connected through a coupler, a flat plate array, or any arrangement of antenna that can form a plane wave. An interrogation wave 156 is transmitted by antenna 152 typically in the radio frequency range. Interrogation wave 156 may be steered by a beam steerer 158 in communication with antenna 152 so that a transmitted wave 160 is deflected toward spatial angle θ. Beam steerer 158, in turn, may be controlled by processor 154 generating control signals 182 to beam steerer 158 and/or a control circuit 180. Wave 160 tends to be polarized in a particular polarization-direction. That is, the electric field of wave 160 may rotate in a first particular polarization-direction (circular polarization) as wave 160 travels. As shown in the figure, wave 160 may have right hand circular polarization (RHCP)—i.e. from a frame of reference, the electric field rotates clockwise.

Referring now also to FIG. 3B, when wave 160 is received by target 164, target 164 generates a responsive wave 165 from an antenna 163 directed toward beam steerer 158 and antenna 152. Response wave 165 is responsive to interrogation message 170 and includes an interrogation response 171. Responsive wave 165 is also polarized in the first particular polarization-direction—right hand circular polarization—as is typically the case where transmitters in a system all transmit with the same polarity. Processor 154 generates control signals **182*b* to beam steerer 158 or circuit 180 to control beam steerer 158 to now receive right hand circular polarized waves at spatial angle θ. This may mean controlling beam steerer 158 to transmit right hand circular polarized waves at an opposite spatial angle or at spatial angle −θ or to deflect waves received from spatial angle θ. This is because when beam steerer 158 is oriented to transmit right hand circular polarized waves at spatial angle −θ, beam steerer 158 is simultaneously oriented to receive right hand circular polarized waves at spatial angle θ. Responsive wave 165 is received by beam steerer 158 and antenna 152, sent through feed network 184, converted into interrogation response 171 and processed by processor 154. In this way, processor 154 can determine whether target 164 is near antenna 152** at spatial angle θ.

As shown in FIGS. 3A and 3B, processor 154 or circuit 180 may control beam steerer 158 to transmit right hand circular polarized interrogation wave 160 at spatial angle θ at a time t=0 seconds. While wave 160 is traveling to target 164, and target 164 is generating responsive wave 165, processor 154 and/or circuit 180 may control beam steerer 158 to receive right hand circular polarized waves at a time t=3 ms though any other time could be used sufficient to switch beam steerer 158.

Figure 4:
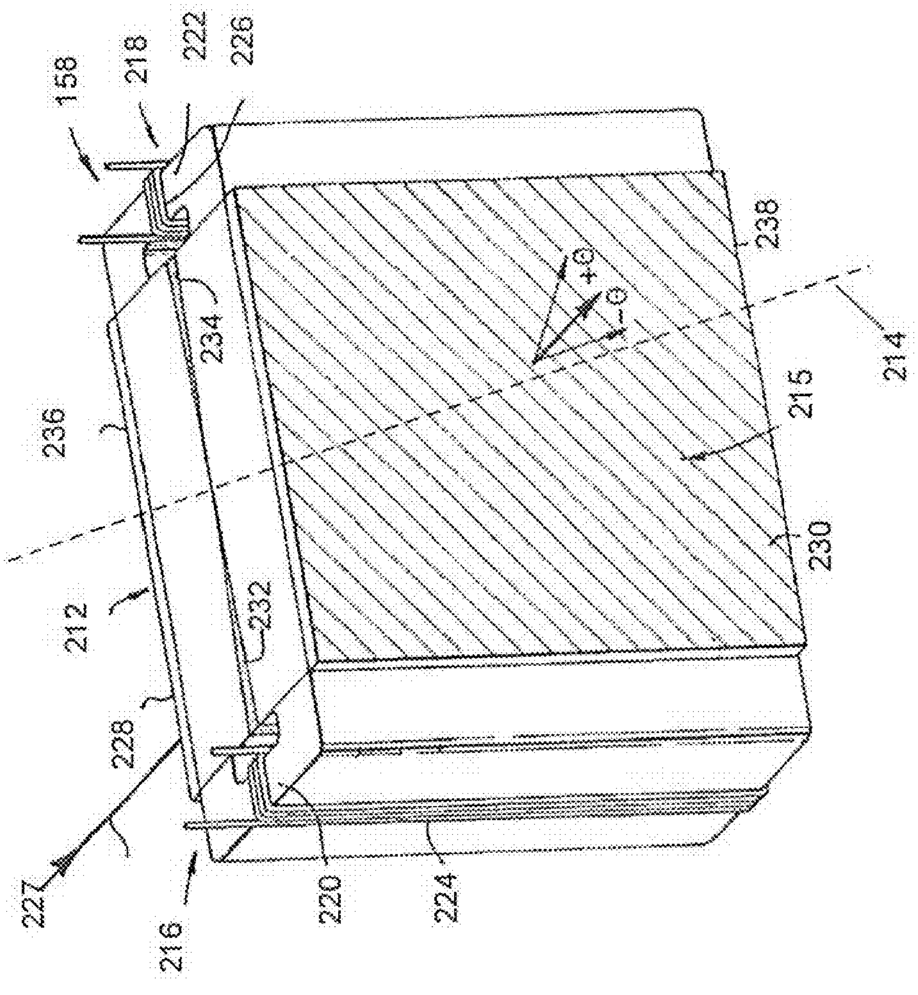
Fig. 4 Prior Art
FIG. 4 is a perspective view of a prior art beam steerer.

Beam steerer 158 is independent of the antenna 152 feeding beam steerer 158 so that antenna 152 can be a more complex antenna with sum and difference capability as is currently used in many identification friend or foe systems for effective beam sharpening. As circular polarizations are comprised of phased horizontal and vertical polarization vectors, antenna 158 could also be comprised of a complex antenna structure capable of transmitting and receiving in horizontal and vertical polarization. A coupler could be used to generate both right-handed and left-handed polarization and separate the two signals. Antenna 152 could generate sum illumination with a single main lobe and/or difference illumination with a double lobed antenna pattern with opposite phases to increase accuracy or exclude target responses or signal clutter Beam steerer 158 may be a beam steerer like that shown in U.S. Pat. No. 6,320,551, the entirety which is hereby incorporated by reference. Referring to FIG. 4, there is shown a reproduction of a figure describing the beam steerer in U.S. Pat. No. 6,320,551. This beam steerer uses a single control over the entire antenna. This significantly reduces the cost of the beam steered antenna, making it useful for large volume mm wave applications requiring beam steering, such as IFF interrogation applications.

Beam steerer 158 comprises a body 212 which is symmetrical about a central plane 214. At ends 216, 218 of body 212 are separate end pieces 220, 222 which carry coils 224, 226. Coils 224, 226 have parallel axes which are orientated normal to a front face 228 and a rear face 230 of body 212. A region of body 212 between the coils 224, 226, comprises an aperture 215 through which a wave 227 may pass.

End pieces 220, 222 are made of a material which is different to the material of body 212 of beam steerer 158. End pieces 220, 222 are of a material having a high magnetization such as mild steel or Swedish iron. Although end pieces 220, 222 are usually uniform, end pieces 220, 222 may be in the form of a laminated stack to reduce eddy currents. In fact, body 212 may itself be in a laminated form. Alternatively end pieces 220, 222 may be an integral part of body 212.

Body 212 comprises ferrite material having a permeability which is dependent on a magnetic field to which the body is subjected. A suitable ferrite material is TTI-3000 which is manufactured by Trans-tech Inc. Extending from ends 216, 218 towards central plane 214 are tapered slots or gaps which are filled with dielectric inserts 232, 234 having a permittivity identical to or similar to that of the ferrite material. A suitable material for the inserts is D13 manufactured by Trans-tech Inc. Although the permittivities of the ferrite material and the insert material are substantially the same, the magnetic permeability of the insert material is lower than that of the ferrite material. As a result, inserts 232, 234 present a relatively high reluctance path or barrier through the body 212 to a magnetic field applied by the coils 224, 226. At a location near coils 224, 226 the reluctance through body 212 is relatively high compared to a body of uniform composition. The reluctance diminishes along the tapered inserts towards the central plane.

Ideally the permeability of inserts 232, 234 is unity although the permittivity may be higher. The permeability of inserts 232, 234 should be less than the permeability of the ferrite material of body 212. The high reluctance paths provided by the insert material present a reluctance to the magnetic flux and the lines of magnetic force shift along the tapered inserts away from the coils 216, 218 to a narrower part of the insert or to a region of the aperture 215 free of inserts 232, 234.

Consequently, inserts 232, 234 force the lines of magnetic force further inward towards the central plane 214 than would be the case in an un-slotted device and a more controlled and uniform gradient in magnetic flux across aperture 215 is obtained.

The length of the slots is dependent upon the width of beam steerer 158, although as a guide each slot should extend from its respective coil about a third of the distance between the coils. For example, beam steerer 158 may have an aperture of dimensions 75 mm×75 mm. Body 212 has a thickness of about 25 mm. The slots are approximately 30 mm long and taper down from 1.0 mm to zero.

The reluctance of body 212 across its thickness where the slots are not present may be about $9\times10^{-4}$ $H^{-1}$. The reluctance of body 212 across its thickness where a dielectric material insert of 0.1 mm thickness (having a permeability of unity) is present may be about $13\times10^{-4}$ $H^{-1}$.

In use, coils 224, 226 are energized by a current source so that the magnetic field produced by coils 224, 226 is in a direction generally normal to faces 228, 230. The magnetic field produced by coil 224 is in an opposite direction the magnetic field produced by the coil 226. There is thus no magnetic field across central plane 214 if coils 224, 226 are energized equally.

As discussed above, wave 227 is a circularly polarized wave directed centrally onto face 228 of beam steer 158 in a spatial-direction normal to face 228 by means of a suitable feed such as a horn antenna. Wave 227 emerges un-deviated from the face 230 if no current or equal current is flowing in coils 216, 218.

When a current flows through coils 216, 218 wave 227 emerges from beam steerer 157 in a spatial-direction at a spatial angle θ degrees to the central plane 214. The deflection of wave 227 arises as a result of differential phase shift along line 214 drawn between coils 216, 218. This differential phase shift is caused by the gradient in magnetization across aperture 215 induced by magnetic fields generated by coils 216, 218. A first magnetic field between central plane 214 and end 216 is in a first direction and a second magnetic field between central plane 214 and end 218 is in a second direction opposite to the first direction. Since the permeability of the ferrite depends on the direction and magnitude of the magnetic field, the phase shift experienced by wave 227 will vary across a width of beam steerer 158 and the wave 227 is thus deflected. To deflect wave 227 in an opposite direction, the direction of current flow in coils 216, 218 is reversed to switch the directions of the magnetic fields and have a corresponding effect on the magnetization. This results in the wave 227 wave emerging from beam steerer 158 in a spatial-direction at a spatial angle −θ degrees to central plane 214.

Beam steerer 158 shown in FIG. 4 or a similar arrangement may be used in system 100 shown in FIG. 3A. Control signal 182*a* could be used to control current applied to coils 216, 218 to direct interrogation wave 160 to be transmitted at spatial angle θ for right hand circular polarization at a first time. Thereafter, as shown in FIG. 3B, control signal 182*b* could be used to control current to be applied to coils 216, 218 to receive waves at spatial angle θ including responsive wave 165 sent using right hand circular polarization.

Figure 5:
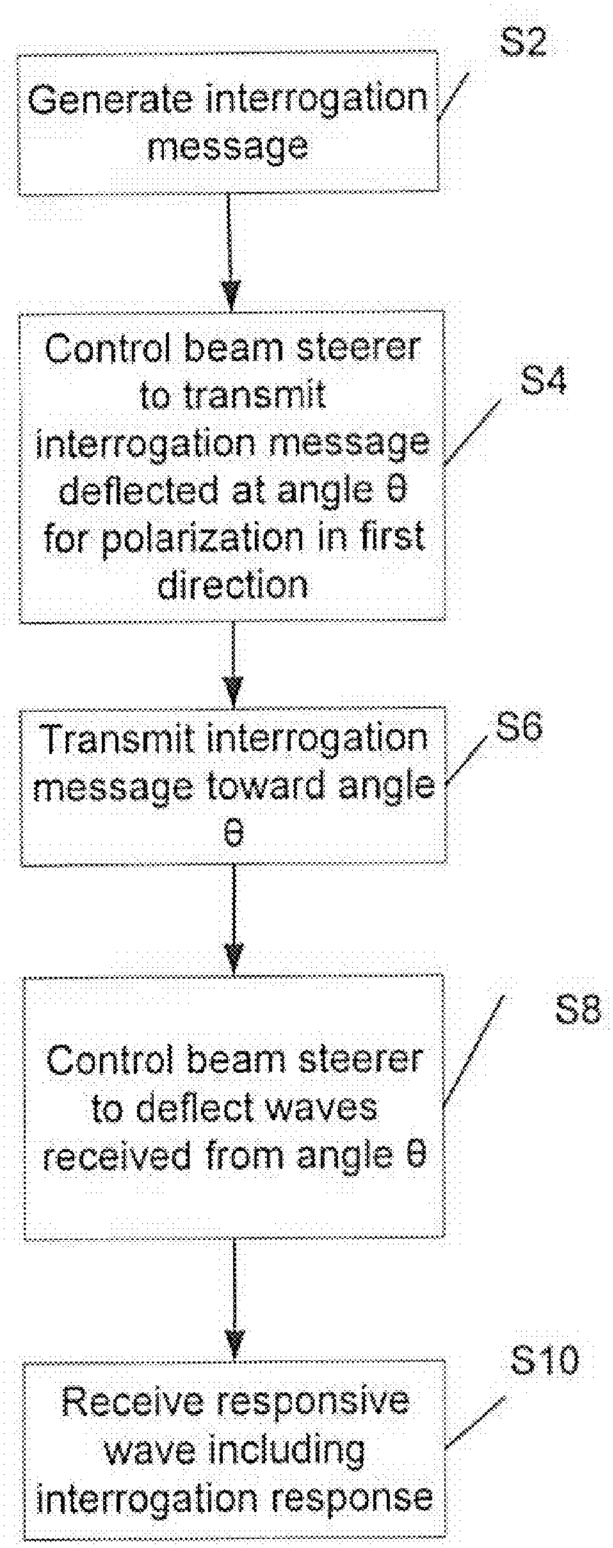
FIG. 5 is a flow chart of a process for communicating with a target in accordance with an embodiment of the invention.

Referring to FIG. 5, there is shown a flow chart of a process which could be performed in accordance with an embodiment of the invention. The process could be performed using, for example, system 100 described above. As shown, at step S2, a processor generates an interrogation message to be transmitted to a target. Such a message may be used to determine whether the target is friend or foe. At step S4, the processor controls a beam steerer to transmit the interrogation message deflected at a spatial angle θ for outward bound waves polarized in a first polarization-direction—such as right hand circular polarization. At step S6, the processor transmits the interrogation message through an antenna and the beam steerer at spatial angle θ.

At step S8, the processor controls the beam steerer to deflect waves received from spatial angle θ. At step S10, the processor receives the responsive wave through the beam steerer and the antenna. Thereafter, the responsive wave including an interrogation response may be processed by the processor.

While the invention has been described with reference to a number of exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to any particular exemplary embodiment disclosed herein.

What is claimed is:

1. A method for communicating, the method comprising:
- generating a first message by a processor;
- controlling a beam steerer to deflect transmitted waves toward a spatial angle;
- transmitting the first message through an antenna in communication with the beam steerer toward the spatial angle;
- controlling the beam steerer to deflect waves received from the spatial angle; and
- receiving a responsive wave at the antenna through the beam steerer at the spatial angle, the responsive wave including a second message responsive to the first message.

2. The method as recited in claim 1, wherein the transmitted waves are polarized in a single polarization-direction.

3. The method as recited in claim 1, wherein the controlling the beam steerer steps include applying a current to the beam steerer.

4. The method as recited in claim 1, wherein the antenna is a horn antenna.

5. The method as recited in claim 1, wherein the antenna is a flat plate antenna.

6. The method as recited in claim 1, wherein:
- the first antenna is effective to transmit and receive sum illumination;
- the first antenna is effective to transmit and receive waves as difference illumination; and
- the method further comprises separating the sum illumination and the difference illumination using a coupler in communication with the first antenna.

7. The method as recited in claim 1, wherein the first message is an interrogation message.

8. A communication system, the system comprising:
- a processor;
- an antenna in communication with the processor; and
- a beam steerer in communication with the antenna and the processor;
- wherein the processor is effective to
  - generate a first message;
  - generate a first control signal to control the beam steerer to deflect transmitted waves toward a spatial angle;

cause the antenna to transmit the first message toward the spatial angle;

generate a second control signal, distinct from the first control signal, to control the beam steerer to deflect waves received from the spatial angle; and receive from the antenna a second message in a responsive wave, the second message responsive to the first message and received by the beam steerer at the spatial angle.

9. The system as recited in claim 8, wherein the transmitted waves are polarized in a single polarization-direction.

10. The system as recited in claim 8, wherein the control the beam steerers include applying a current to the beam steerer.

11. The system as recited in claim 8, wherein the antenna is a horn antenna.

12. The system as recited in claim 8, wherein the antenna is a flat plate antenna.

13. The system as recited in claim 8, wherein:

the first antenna is effective to transmit and receive sum illumination;

the first antenna is effective to transmit and receive waves as difference illumination; and the system further comprises a coupler in communication with the first antenna, the coupler effective to separate the sum illumination and the difference illumination.

14. The system as recited in claim 8, wherein the first message is an interrogation message.

15. The system as recited in claim 14, wherein the antenna is a first antenna and the system further comprises:

a target, the target including a second antenna, the second antenna effective to receive the interrogation message and transmit the responsive wave.

16. A communication system, the system comprising:

a processor;

a first antenna in communication with the processor; and a beam steerer in communication with the first antenna and the processor;

wherein the processor is effective to generate a first message;

generate a first control signal to control the beam steerer to deflect waves toward a spatial angle and to transmit waves polarized in a first polarization-direction toward the spatial angle by applying a first current to the beam steerer;

cause the antenna to transmit the first message toward the spatial angle using waves circularly polarized in the first polarization-direction;

a target, the target including a second antenna, the second antenna effective to receive the first message and transmit a responsive wave including a second message responsive to the first message, the responsive wave including waves circularly polarized in the first polarization-direction, the processor further effective to generate a second control signal, distinct from the first control signal, to control the beam steerer to deflect waves received from the spatial angle and to receive waves polarized in the first polarization-direction from the spatial angle by applying a second current to the beam steerer; and receive the second message from the first antenna.

17. The system as recited in claim 16, wherein the first antenna is a horn antenna.

18. The system as recited in claim 16, wherein the first antenna is a flat plate antenna.

19. The system as recited in claim 16, wherein:

the first antenna is effective to transmit and receive sum illumination;

the first antenna is effective to transmit and receive waves as difference illumination; and the system further comprises a coupler in communication with the first antenna, the coupler effective to separate the sum illumination and the difference illumination.

20. The system as recited in claim 16, wherein the first message is an interrogation message.

* * * * *